US007490171B2

(12) United States Patent
Saint-Hilaire et al.

(10) Patent No.: US 7,490,171 B2
(45) Date of Patent: Feb. 10, 2009

(54) UNIVERSAL PLUG-AND-PLAY MIRRORING DEVICE, SYSTEM AND METHOD

(75) Inventors: Ylian Saint-Hilaire, Hillsboro, OR (US); Bryan Y. Roe, Camas, WA (US); Nelson F. Kidd, Tigard, OR (US)

(73) Assignee: Intel Corporation, Santa Clara, CA (US)

(*) Notice: Subject to any disclaimer, the term of this patent is extended or adjusted under 35 U.S.C. 154(b) by 925 days.

(21) Appl. No.: 10/440,790

(22) Filed: May 19, 2003

(65) Prior Publication Data

US 2004/0233904 A1 Nov. 25, 2004

(51) Int. Cl.
*G06F 15/16* (2006.01)
(52) U.S. Cl. .................. 709/249; 709/223; 709/224; 709/225; 709/226; 709/245
(58) Field of Classification Search ......... 709/227–229, 709/230–237, 223–226, 245, 249
See application file for complete search history.

(56) References Cited

U.S. PATENT DOCUMENTS

| 6,910,068 | B2 * | 6/2005 | Zintel et al. ............... 709/220 |
| 7,017,148 | B2 * | 3/2006 | Kumar ....................... 717/114 |
| 2001/0030970 | A1 | 10/2001 | Wiryaman | |
| 2002/0083143 | A1 | 6/2002 | Cheng | |
| 2003/0097425 | A1 * | 5/2003 | Chen ........................ 709/220 |
| 2004/0236869 | A1 | 11/2004 | Moon | |
| 2006/0280190 | A1 * | 12/2006 | Chen et al. ................. 370/401 |

FOREIGN PATENT DOCUMENTS

| KR | 0188742 | 9/2000 |
| WO | WO 03/003666 | 1/2003 |
| WO | WO-03003666 A1 | 1/2003 |

OTHER PUBLICATIONS

Office Action for Chinese Application Serial No. 200310121588.8, (Mar. 3, 2006),13 pgs.
"EP office action dated May 29, 2007 for application No. 04785489. 8-1244", 5 pgs.
Office Action for Korean Patent Application No. 10-2005-7021909 mailed on Oct. 31, 2006, 5 Pages.

(Continued)

*Primary Examiner*—Saleh Najjar
*Assistant Examiner*—Shawki S Ismail
(74) *Attorney, Agent, or Firm*—Grossman, Tucker, Perreault & Pfleger, PLLC (57) ABSTRACT

Described are a first local network comprising one or more Universal Plug and Play (UPnP) entities and a second local network comprising at least one remote UPnP entity. A presence of the remote UPnP entity on the first local network may be emulated or "mirrored" to enable UPnP entities in the first local network to communicate with the remote UPnP entity using an address defined locally on the first local network.

41 Claims, 2 Drawing Sheets

OTHER PUBLICATIONS

Office Action Received for Chinese Patent Application No. 200310121588.8, mailed on Nov. 10, 2006, 6 Pages.

Office Action Received for Chinese Patent Application No. 200310121588.8, mailed on May 11, 2007, 8 Pages.

International Preliminary Report on Patentability for PCT Patent Application No. PCT/US2004/012022, mailed on Dec. 8, 2005, 7 Pages.

Examiner's Written Opinion for Singapore Patent Application No. 200507240-0 received from the Austrian Patent Office Service and Information Center, mailed Aug. 27, 2007; 5 pages.

Office Action dated Aug. 13, 2008 issued in Chinese Patent Application No. 2003101215888; 4 pages.

PCT Search Report Dated Oct. 13, 2004.

* cited by examiner

UNIVERSAL PLUG-AND-PLAY MIRRORING DEVICE, SYSTEM AND METHOD

BACKGROUND

1. Field

The subject matter disclosed herein relates to data communications. In particular, the subject matter disclosed herein relates to the transmission of data between devices coupled to different networks.

2. Information

The Universal Plug and Play (UPnP) Device Architecture, ver. 1.0, Jun. 8, 2000 describes a networking architecture enabling peer-to-peer network connectivity of intelligent appliances, wireless devices, personal computers and other devices with communication capabilities. UPnP provides a protocol enabling the automatic discovery of devices joining a network. A device may dynamically join a network, obtain a network address, convey its capabilities to other devices on the network, and learn of the presence and capabilities of other devices on the network using a Simple Service Discovery Protocol (SSDP).

Devices on different, distinct local networks may typically communicate with one another over a wide area network (WAN). For example, the local networks are typically coupled by an Internet connection and a virtual private network (VPN) may be formed between different networks. The VPN may enable communications to "tunnel" between devices over the Internet connection. A VPN typically allows devices on different local networks to communicate with as if the devices were on the same local network. With UPnP entities on different local networks, however, latencies in communication through a VPN make the discovery process unreliable using the SSDP.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Storage medium" as referred to herein relates to media capable of maintaining expressions which are perceivable by one or more machines. For example, a storage medium may comprise one or more storage devices for storing machine-readable instructions or data. Such storage devices may comprise storage media such as, for example, optical, magnetic or semiconductor storage media. However, these are merely examples of a storage medium and embodiments of the present invention are not limited in these respects.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a storage medium in combination with processing circuitry to execute such machine-readable instructions. However, these are merely examples of structures which may provide logic and embodiments of the present invention are not limited in this respect.

A "communication network" as referred to herein relates to a plurality of entities that may exchange data through a data transmission medium. In one example, each entity in the communication network may be associated with an "address" that is used for transporting data to the entity according to a data communication protocol. However, this is merely an example of a communication network and embodiments of the present invention are not limited in this respect.

An "Internet connection" as referred to herein relates a means for accessing any one of several entities coupled to a communication network known as the "Internet." The Internet comprises a networking infrastructure comprising a network of networks. An entity on the Internet may be associated with a "globally routable Internet Protocol (IP) address" which may be used for addressing data transmissions according to an Internet Protocol. An Internet connection may be provided by any one of several commercial Internet service providers (ISPs). An ISP may forward a message from a subscriber to any one of several entities on the Internet according to a globally routable IP address associated with the entity. However, these are merely examples of an Internet connection and embodiments of the present invention are not limited in these respects.

A "local network" as referred to herein relates to a communication network having entities that communicate according to a locally defined data communication protocol. For example, each entity in a local network may be associated with a "local address" which is unique among local addresses allocated to entities in the local network. This may enable entities in the local network to communicate with one another using the allocated local addresses and the locally defined communication protocol. Using only the allocated local addresses and locally defined communication protocol, however, each entity in the local network may be limited to communicating with entities in the local network and may not be capable of communicating with other entities in a larger communication network that includes the local network. However, these are merely examples of a local network and embodiments of the present invention are not limited in these respects.

A "gateway" as referred to herein relates to an entity in a local network that is capable of communicating with other entities in outside of the local network. For example a gateway may be capable of communicating with entities in the local network using allocated local addresses according to a locally defined data communication protocol and also capable of communicating with entities outside of the local network using a different addressing scheme or data communication protocol. Such a gateway may also be capable of forwarding data communications between entities in the local network and entities outside of the local network. However, these are merely examples of a gateway and embodiments of the present invention are not limited in these respects.

A "Universal Plug and Play (UPnP) entity" as referred to herein relates to an entity that is capable of being dynamically configured to communicate with other entities on a network upon being coupled to the network. For example, according to one or more UPnP protocols, a UPnP entity may join a local network by automatically obtaining a local address, conveying its capabilities to other entities on the local network and/or learning the presence and capabilities of other entities coupled to the local network. However, these are merely examples of UPnP entity and embodiments of the present invention are not limited in these respects.

A "UPnP device" as referred to herein relates to a UPnP entity that is capable of providing one or more services to other UPnP entities coupled to a local network. A UPnP device may be associated with a "service description" comprising a list of commands or actions that one of its services may respond to, including parameters or arguments defining each command or action. A UPnP entity may embody more than one "logical" UPnP devices where each logical UPnP device is associated with a local address. However, these are merely examples of a UPnP device and embodiments of the present invention are not limited in these respects.

A "UPnP control point" as referred to herein relates to a UPnP entity that is capable of receiving services from one or more UPnP devices. Upon joining a local network, a UPnP control point may obtain a service description associated with one or more UPnP devices on the local network. Subsequently, when other UPnP devices join the local network, the UPnP control point may obtain service descriptions associated with the other UPnP devices. Based upon a service description associated with a UPnP device, a UPnP control point may poll the UPnP device for service state variables and receive indications of events associates with services provided by the UPnP device. However, this is merely an example of a UPnP control point and embodiments of the present invention are not limited in these respects.

Briefly, embodiments of the present invention relate to first a local network comprising one or more UPnP entities and a second local network comprising at least one remote UPnP entity. A presence of the remote UPnP entity on the first local network may be emulated or "mirrored" to enable UPnP entities in the first local network to communicate with the remote UPnP entity using a local address defined on the first local network. However, this is merely an example embodiment and other embodiments of the present invention are not limited in these respects.

Figure 1:
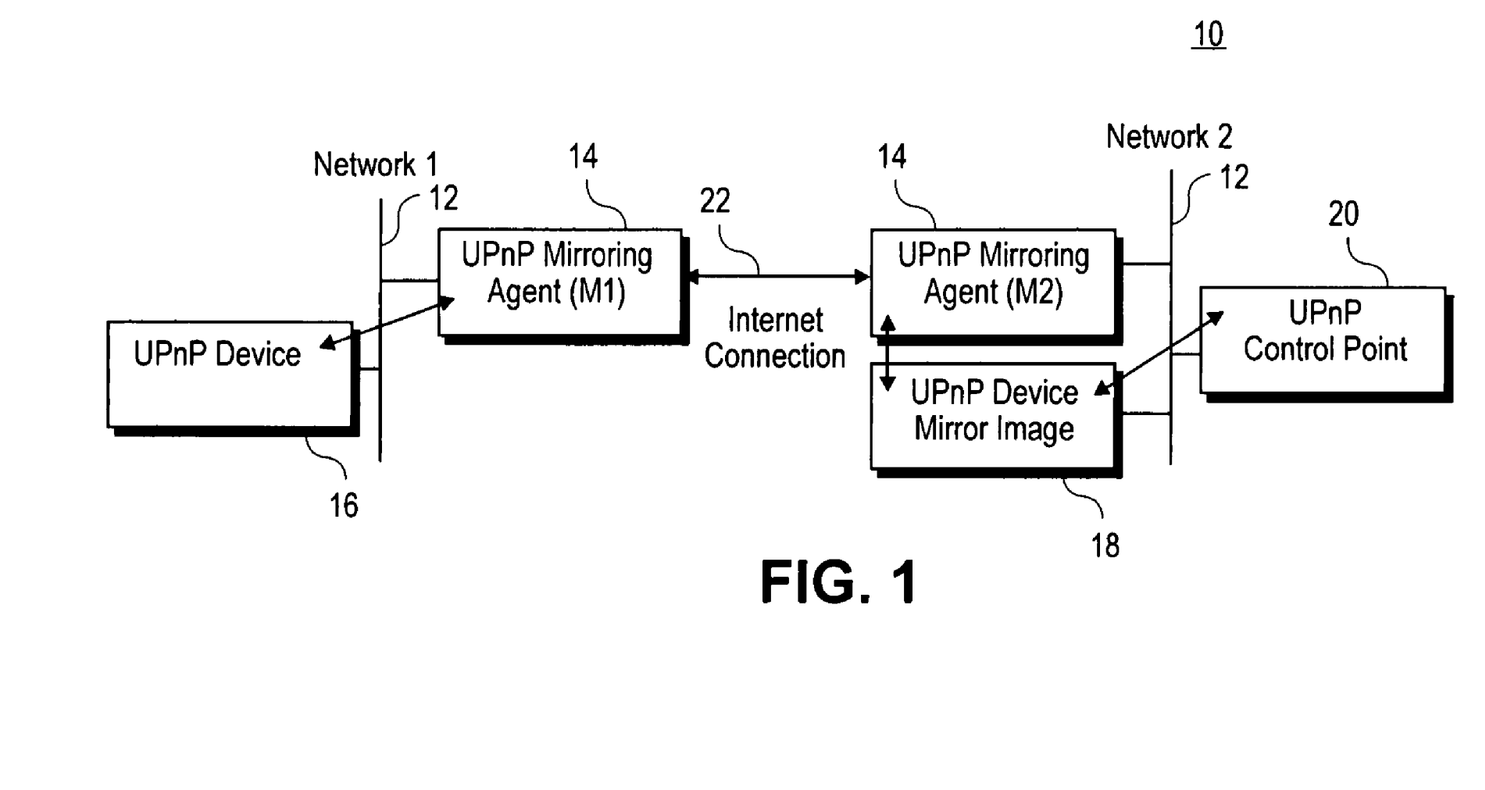
FIG. 1 shows a network topology comprising a first local network and a second local network.

FIG. 1 shows a network topology 10 comprising first and second local networks 12, Network 1 and Network 2. Coupled to Network 1 is a UPnP device 16 and coupled to Network 2 is a UPnP control point 20. It should be understood that additional UPnP entities may be coupled to either of the local networks 12.

Each local network 12 may also comprise a device (not shown) for hosting one or more instances of a UPnP mirroring agent 14, UPnP mirroring agent M1 hosted on Network 1 or UPnP mirroring agent M2 hosted on Network 2. Devices on respective local networks may by coupled by an Internet connection 22 to enable the UPnP mirroring agent M1 on Network 1 to communicate with the UPnP mirroring agent M2 on Network 2. As the UPnP device 16 and UPnP control point 20 may be coupled to different, distinct local networks 12, according to an embodiment the UPnP device 16 may be treated as a "remote" UPnP entity to the UPnP control point 20 and other UPnP entities coupled to Network 2. Here, the UPnP mirroring agent M2 may create a UPnP device mirror image 18 to emulate a presence of the UPnP device 16 on Network 2. Having a local address on Network 2, the UPnP device mirror image 18 may then provide services of the UPnP device 16 to the UPnP control point 20.

According to an embodiment, the Internet connection 22 may be provided by one or more commercially available Internet service providers (ISPs) capable of supporting data transmission between the local networks 12 according to a transmission control protocol/Internet protocol (TCP/IP) or other protocols that may be used for transmitting data. The UPnP mirroring agents 14 may employ data compression of a data packet payload for transmission in the Internet connection 22 when transmitting to the Internet connection 22. Similarly, the UPnP mirroring agents 14 may employ data decompression at a receiving end to recover the compressed data. Each local network 12 may be coupled to the Internet connection 22 by any one of several data transmission mediums such as, for example, unshielded twisted wire pair, optical or coaxial cabling, or wireless transmission media. Accordingly, each local network may also comprise a data transceiver and physical layer communication device (e.g., DSL, voice band or modem cable modem, or optical data transponder) suitable for transmitting data to and receiving data from the particular data transmission medium.

In addition to transmitting and receiving data packets through the Internet connection 22 according to the TCP/IP protocol, the UPnP mirroring agents 14 may be formed to provide a secure communication channel over the Internet connection 22. For example, the UPnP mirroring agents 14 may be coupled to the Internet connection 22 through a firewall (e.g., a Hypertext Transfer Protocol (HTTP) proxy). Also, a transmitting UPnP mirroring agent 14 may encrypt data in a data packet payload for transmission and a receiving UPnP mirroring agent 14 may decrypt the data packet payload in the received data packet.

According to an embodiment, each UPnP mirroring agent 14 may be hosted on any one of several devices coupled to a corresponding local network 12. Such a hosting device may include, for example, a gateway that is capable of transmitting data between each UPnP entity coupled to the corresponding local network 12 and the Internet connection 22. Each UPnP mirroring agent 14 may be allocated a globally routable Internet Protocol (IP) address. In one embodiment, the gateway may be included in a subscriber set-top box comprising a modem and/or data transceiver to transmit data to and receive data from the Internet connection 22. Such a subscriber set-top box may also comprise a data transceiver to transmit data to or receive data from entities on the local network 12. However, this is merely an example of how a UPnP mirroring agent may be hosted on a local network and embodiments of the present invention are not limited in this respect.

According to an embodiment, each UPnP entity in a local network 12 may be allocated a local address that is unique among addresses allocated among the UPnP entities in the local network 12. Such a local address allocated to a UPnP entity may comprise a UPnP unique identifier which enables communication with the UPnP entity according to a data communication protocol defined on the local network 12. However, this is merely an example of how a local address may be allocated to a UPnP entity and embodiments of the present invention are not limited in these respects.

According to an embodiment, the UPnP mirroring agent M2 may allocate a UPnP unique identifier to the UPnP device mirror image 18 (created to emulate a presence of the UPnP device 16 on Network 2), enabling the UPnP control point 20 to address communications to the UPnP device image 18. The UPnP mirroring agent M2 may allocate a UPnP unique identifier to the UPnP device mirror image 18 that is different from a UPnP unique identifier allocated to the corresponding UPnP device 16 on Network 1. This can prevent conflicts with UPnP unique identifiers allocated to other UPnP entities on Network 2.

According to an embodiment, the UPnP mirroring agent M2 may also associate the UPnP device mirror image 18 with the UPnP unique identifier of the corresponding UPnP device 16 to enable communication with the UPnP device 16 over the Internet connection 22 (e.g., through the UPnP mirroring agent M1). This may enable the UPnP mirroring agents M1 and M2 to communicate with one another without regard to the topologies of Network 1 or Network 2. Accordingly, this may enable the UPnP mirroring agent M2 to roam or change its globally routable IP address while maintaining communication between the UPnP device 16 and UPnP control point 20.

In one embodiment, a UPnP mirroring agent 14 may be implemented as machine-readable instructions that are encoded in a storage medium and executed by a processor or controller. In other embodiments, a UPnP mirroring agent 14 may be implemented as hardwired logic (e.g., ASIC or FPGA) or a combination of machine-readable instructions and hardwired logic. However, these are merely examples of logic that may be used to implement a UPnP mirroring agent and embodiments of the present invention are not limited in these respects.

Figure 2:
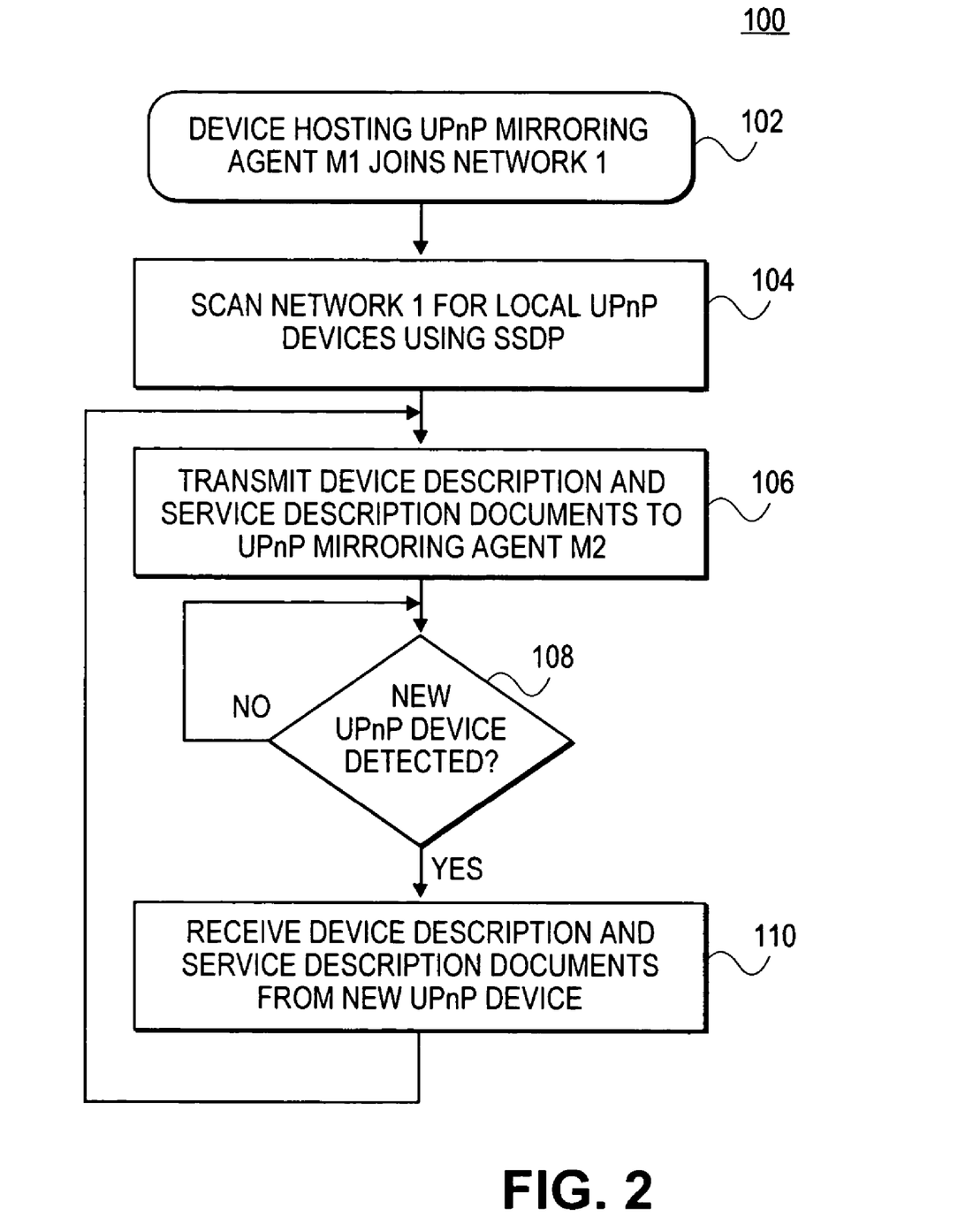
FIG. 2 shows a flow diagram illustrating a process executed by a UPnP mirroring agent according to an embodiment of the network topology shown in FIG. 1.

FIG. 2 shows a flow diagram illustrating a process 100 executed by a mirroring agent 14 to discover UPnP entities on a local network according to an embodiment of the network topology shown in FIG. 1. In response to a device hosting the UPnP mirroring agent M1 joining Network 1, at block 104 the UPnP mirroring agent M1 may scan Network 1 for local UPnP devices using the Simple Service Discovery Protocol (SSDP) as described in the Universal Plug and Play Device Architecture, Ver. 1.0, Jun. 8, 2000, published by Microsoft Corporation. For example, the UPnP mirroring agent M1 may transmit a multicast search request to all UPnP entities on Network 1. In response to the search request, the UPnP device 16 may provide the UPnP mirroring agent M1 with a device description document and a service description document. At block 106, the UPnP mirroring agent M1 may transmit the received device description and service description documents to the UPnP mirroring agent M2 through the Internet connection 22. If a new UPnP device is detected at diamond 108 (e.g., a new UPnP device joins Network and "advertises" its existence), the UPnP mirroring agent M1 may receive device description and service description documents from the new UPnP device at block 110. The UPnP mirroring agent M1 may then transmit the device description and service description documents of the new UPnP device to the UPnP mirroring agent at block 106, using, for example, the HTTP protocol.

According to an embodiment, at block 106 the UPnP mirroring agent M1 may transmit to the UPnP mirroring agent M2 all or a portion of a service description document to M2 to expose all or only a subset of the services provided by UPnP device 16. By transmitting only a portion of the service description document to expose only a subset of the services, the UPnP mirroring agent M1 may restrict the use of the UPnP device 16 by UPnP control points on Network 2. In one embodiment, the UPnP mirroring agent M1 may restrict the use of the UPnP device 16 based upon an authentication profile associated with the UPnP mirroring agent M2 and UPnP control points on Network 2. However, this is merely an example of how a UPnP mirroring agent may restrict the use of a UPnP device by remote UPnP control points and embodiments of the present invention are not limited in these respects.

Upon receipt of device description and service description documents transmitted at block 106, the UPnP mirroring agent M2 may advertise to UPnP control points on Network 2 the presence of a UPnP device (e.g., UPnP device mirror image 18) on the Network 2 according to the SSDP. For example, the UPnP mirroring agent M2 may allocate a local address to the UPnP device mirror image 18 and advertise the existence of a UPnP device by broadcasting the allocated local address to the UPnP control points on Network 2, and forwarding the received device descriptions and service description documents to the UPnP control points. If a new UPnP control point joins Network 2, the UPnP mirroring agent M2 may forward the allocated local address, and the received device descriptions and service description documents to the new UPnP control points according to the SSDP in response to a search request from the new UPnP control point.

Based upon services indicated in the forwarded service description document, the UPnP control point 20 may invoke "actions" on one or more of the services by transmitting an action request using a Simple Object Access Protocol (SOAP). The action request may be addressed according to the local address allocated to the UPnP device mirror image 18 which is then handled by the UPnP mirroring agent M2. Upon receipt of the action request, the UPnP mirroring agent M2 may forward the request to the UPnP mirroring agent M1 through the Internet connection 22 according to the globally routable IP address allocated to the UPnP mirroring agent M1. The UPnP mirroring agent M1 may then forward the action request to the UPnP device 16 according to a local address allocated to the UPnP device 16. In forwarding the action request to the UPnP device 16, the UPnP mirroring agent M1 may indicate the origin of the request from an emulated UPnP control point (e.g., UPnP control point mirror image, not shown) having local address on the Network 1. In response to receipt of the action request, the UPnP device 16 my reply to the originator of the action request with a result message. Any result message generated in response to the action request (from the UPnP device 16) may be directed to the local address of the emulated UPnP control point, enabling the UPnP mirroring agent M2 to forward the result message through the Internet connection 22 according to the globally routable IP address of the UPnP mirroring agent M2.

According to an embodiment, the UPnP control point 20 may subscribe to one or more "events" defined in a service provided by the UPnP device 16. Such a subscription to an event may be conducted as part of an action invocation as described above. Upon detecting a change in a state variable associated with the subscribed event, the UPnP device 16 may transmit an event message to a subscribing UPnP control point to indicate the change in the state variable. In transmitting the event message, the UPnP device 16 may address the event message according to local address on Network 1 corresponding to an emulated UPnP control point. This may enable the UPnP mirroring agent M1 to forward the event message through the Internet connection 22 according to the globally routable IP address of the UPnP mirroring agent M2. The UPnP mirroring agent M2 may then forward the event message to the subscribing UPnP control point 20 according to a local address associated with the UPnP control point 20 on Network 2.

According to an embodiment multiple UPnP control points (not shown) on the Network 2 may subscribe to the same event defined by a service provided by the UPnP device 16. In response to an event message corresponding the event, the UPnP mirroring agent M1 may forwarding a single event message across the Internet connection 22 for all of the subscribing UPnP control points on Network 2. Upon receipt of the single event message forwarded from the UPnP mirroring agent M1, the UPnP mirroring agent M2 may forward the event message as a multicast message to each of the subscribing UPnP control points according to the local addresses (on Network 2) associated with the subscribing UPnP control points.

According to an embodiment, either UPnP mirroring agent M1 or M2 may maintain a record associating the multiple subscribing UPnP control points with the event. In one embodiment, the UPnP mirroring agent M1 may forward the event message through the Internet connection 22 with appended destination information associating the event message with the subscribing UPnP control points. The UPnP mirroring agent M2 may then forward the event message to subscribing control points based upon the appended destination information. In another embodiment, the UPnP mirroring agent M2 may associate the subscribed event with the subscribing UPnP control points and automatically forward all corresponding event messages to the associated UPnP control points.

According to an embodiment, the UPnP mirroring agents M1 and M2 may transmit and receive data over the Internet connection 22 using a SOAP connection. Accordingly, actions and event messages may be encapsulated in IP packets for transmission and de-encapsulated upon receipt.

In addition to facilitating communication between UPnP devices on Network 1 and UPnP control points on Network 2, in some embodiments the UPnP mirroring agents M1 and M2 may also simultaneously facilitate communication between UPnP devices (not shown) on Network 2 and UPnP control points (not shown) on Network 1. Accordingly each UPnP mirroring agent 14 may be capable of transmitting and receiving (through the Internet connection 22) SSDP messages for advertising UPnP devices, actions and event messages to enable bidirectional capability.

According to an embodiment, a UPnP mirroring agent 14 may communicate with two or more other UPnP mirroring agents (not shown) across the Internet connection 22. Accordingly, a UPnP control point coupled to the same local network as the UPnP mirroring agent may receive services from remote UPnP devices on two or more local networks. Similarly, a UPnP device coupled to the same local network as the UPnP mirroring agent may provide services to remote UPnP control points on two or more local networks.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
   a first data transceiver coupled to a first local network, said first data transceiver configured to transmit data to and receive data from an Internet connection;
   a second data transceiver coupled to a second local network comprising at least one remote UPnP entity, said second data transceiver configured to transmit data to and receive data from said Internet connection; and
   a UPnP mirroring agent comprising:
      logic to communicate with said second local network via the Internet connection;
      logic to emulate a presence of the at least one remote UPnP entity on said first local network to enable one or more UPnP entities coupled to the first local network to communicate with the emulated UPnP entity according to a local address associated with the emulated UPnP entity, wherein said logic to emulate is configured to allocate the local address to the remote UPnP entity as a UPnP unique identifier defined on the first local network, and to advertise the presence of the remote UPnP entity on the first local network to one or more UPnP entities on the first local network;
      logic to receive all or a portion of a service description document to expose all or a subset of services provided by said remote UPnP entity, in response to a second UPnP mirroring agent joining said second local network, thereby allowing for restricted use of the remote UPnP entity on the first local network, and
      logic to transmit to said second UPnP mirroring agent all or a portion of a service description document to expose all or a subset of services provided by said one or more UPnP entities coupled to said first local network.

2. The system of claim 1, wherein the system further comprises a modem coupled to the second data transceiver, said modem coupled to an HTTP firewall.

3. The system of claim 2, wherein the system further comprises logic to encrypt data for transmission through the modem and logic to decrypt data received from the modem.

4. The system of claim 1, the system further comprising a modem coupled to the second data transceiver, the modem being capable of transmitting data to or receiving data from an unshielded twisted wire pair medium.

5. The system of claim 1, the system further comprising an optical transponder coupled to the second data transceiver, the optical transponder being capable of transmitting data to or receiving data from an optical transmission medium.

6. A method comprising:
   communicating, via a UPnP mirroring agent, with one or more UPnP entities coupled to a first local network;
   communicating, via the UPnP mirroring agent, with a second local network via an Internet connection, the second local network comprising at least one remote UPnP entity;
   emulating, via the UPnP mirroring agent, a presence of the at least one remote UPnP entity on the first network to enable the one or more UPnP entities coupled to the first local network to communicate with the emulated UPnP entity according to a local address associated with the emulated UPnP entity, wherein said emulating includes allocating the local address to the remote UPnP entity as a UPnP unique identifier defined on the first local network, and advertising the presence of the remote UPnP entity on the first local network to one or more UPnP entities on the first local network;

receiving, via the UPnP mirroring agent, all or a portion of a service description document to expose all or a subset of services provided by the remote UPnP entity, in response to a second UPnP mirroring agent joining the second local network, thereby allowing for restricted use of the remote UPnP entity on the first local network; and transmitting, via the UPnP mirroring agent, to the second UPnP mirroring agent all or a portion of a service description document to expose all or a subset of services provided by the one or more UPnP entities coupled to the first local network.

7. The method of claim 6, wherein the remote UPnP entity comprises a UPnP control point.

8. The method of claim 7, wherein emulating the presence of the at least remote entity on the first network further comprises:

receiving an action request from the Internet connection originating at the UPnP control point; and forwarding the action request to at least one UPnP device coupled to the first network.

9. The method of claim 8, the method further comprising:

receiving a result message from the at least one UPnP device in response to the forwarded action request, the result message being addressed according to the address associated with the emulated UPnP entity; and forwarding the received result message to the UPnP control point via the Internet connection.

10. The method of claim 9, the method further comprising:

receiving an event subscription request from the Internet connection, the event subscription request originating at the UPnP control point; and forwarding the event subscription request to at least one UPnP device coupled to the first local network.

11. The method of claim 10, the method further comprising:

receiving an event message from the at least one UPnP device corresponding with the event subscription request; and forwarding the received event message to the UPnP control point via the Internet connection.

12. The method of claim 6, wherein the remote UPnP entity comprises a UPnP device.

13. The method of claim 12, wherein advertising the presence of the UPnP device further comprises:

receiving from the Internet connection at least one of a device description document and the service description document associated with the UPnP device, the at least one document originating at the UPnP device; and transmitting at least a portion of the at least one received document to one or more UPnP entities on the first local network.

14. The method of claim 12, wherein emulating the presence of the at least remote entity on the first local network further comprises:

receiving an action request from a UPnP control point on the first local network addressed according to the local address; and forwarding the action request to the UPnP device through the Internet connection.

15. The method of claim 14, the method further comprising:

receiving a result message from the Internet connection originating at the UPnP device in response to the forwarded action request; and forwarding the received result message to the UPnP control point.

16. The method of claim 12, the method further comprising:

receiving an event subscription request addressed according to local address, the event subscription request originating at a UPnP control point; and forwarding the event subscription request through the Internet connection to the UPnP device.

17. The method of claim 16, the method further comprising:

receiving an event message from the Internet connection, the event message originating at the at least one UPnP device corresponding with the event subscription request; and forwarding the received event message to the UPnP control point.

18. The method of claim 16, the method further comprising:

receiving a single event message from the Internet connection, the event message originating at the at least one UPnP device corresponding with the event subscription request; and forwarding the received event message to a plurality of UPnP control points.

19. An article comprising:

a storage medium comprising machine-readable instructions stored thereon to:

communicate, via a UPnP mirroring agent, with one or more UPnP entities coupled to a first local network;

communicate, via the UPnP mirroring agent, with a second local network via an Internet connection, the second local network comprising at least one remote UPnP entity;

emulate, via the UPnP mirroring agent, a presence of the at least one remote UPnP entity on the first network to enable the one or more UPnP entities coupled to the first local network to communicate with the emulated UPnP entity according to a local address associated with the emulated UPnP entity;

allocate the local address to the remote UPnP entity as a UPnP unique identifier defined on the first local network;

advertise the presence of the remote UPnP entity on the first local network to one or more UPnP entities on the first local network;

receive, via the UPnP mirroring agent, all or a portion of a service description document to expose all or a subset of services provided by the remote UPnP entity, in response to a second UPnP mirroring agent joining the second local network, thereby allowing for restricted use of the remote UPnP entity on the first local network; and transmit, via the UPnP mirroring agent, to the second UPnP mirroring agent all or a portion of a service description document to expose all or a subset of services provided by the one or more UPnP entities coupled to the first local network.

20. The article of claim 19, wherein the remote UPnP entity comprises a UPnP control point.

21. The article of claim 20, wherein the storage medium further comprises machine-readable instructions stored thereon to:

receive an action request from the Internet connection originating at the UPnP control point; and forward the action request to at least one UPnP device coupled to the first network.

22. The article of claim 21, wherein the storage medium further comprises machine-readable instructions stored thereon to:
receive a result message from the at least one UPnP device in response to the forwarded action request, the result message being addressed according to the address associated with the emulated UPnP entity; and
initiate forwarding of the received result message to the UPnP control point via the Internet connection.

23. The article of claim 22, wherein the storage medium further comprises machine-readable instructions stored thereon to:
receive an event subscription request from the Internet connection, the event subscription request originating at the UPnP control point; and
initiate forwarding the event subscription request to at least one UPnP device coupled to the first local network.

24. The article of claim 23, wherein the storage medium further comprising machine-readable instructions stored thereon to:
receive an event message from the at least one UPnP device corresponding with the event subscription request; and
initiate forwarding the received event message to the UPnP control point via the Internet connection.

25. The article of claim 19, wherein the remote UPnP entity comprises a UPnP device.

26. The article of claim 25, wherein the storage medium further comprises machine-readable instructions stored thereon to:
receive from the Internet connection at least one of a device description document and the service description document associated with the UPnP device, the at least one document originating at the UPnP device; and
initiate transmission of at least a portion of the at least one received document to one or more UPnP entities on the first local network.

27. The article of claim 25, wherein storage medium further comprises machine-readable instructions stored thereon to:
receive an action request from a UPnP control point on the first local network addressed according to the local address; and
initiate forwarding of the action request to the UPnP device through the Internet connection.

28. The article of claim 27, wherein the storage medium further comprises machine-readable instructions stored thereon to:
receive a result message from the Internet connection originating at the UPnP device in response to the forwarded action request; and
initiate forwarding the received result message to the UPnP control point.

29. The article of claim 25, wherein the storage medium further comprises machine-readable instructions stored thereon to:
receive an event subscription request addressed according to local address, the event subscription request originating at a UPnP control point; and
initiate forwarding the event subscription request though the Internet connection to the UPnP device.

30. The article of claim 29, wherein the storage medium further comprises machine-readable instructions stored thereon to:
receive an event message from the Internet connection, the event message originating at the at least one UPnP device corresponding with the event subscription request; and
initiate forwarding the received event message to the UPnP control point.

31. The article of claim 29, wherein the storage medium further comprises machine-readable instructions stored thereon to:
receive a single event message from the Internet connection, the event message originating at the at least one UPnP device corresponding with the event subscription request; and
initiate forwarding the received event message to a plurality of UPnP control points.

32. A system comprising:
a modem to at least one of transmit data to and receive data from a data transmission medium;
a gateway coupled to the modem to communicate with an Internet service provider through the modem and coupled to a first local network to communicate with one or more UPnP entities in the first local network;
logic of a first UPnP mirroring agent to emulate a presence of at least one remote UPnP entity on the first network to enable the one or more UPnP entities coupled to the first local network to communicate with the emulated UPnP entity according to a local address associated with the emulated UPnP entity, wherein said logic of a first UPnP mirroring agent to emulate is configured to allocate the local address to the remote UPnP entity as a UPnP unique identifier defined on the first local network, and to advertise the presence of the remote UPnP entity on the first local network to one or more UPnP entities on the first local network;
logic to receive all or a portion of a service description document to expose all or a subset of services provided by the remote UPnP entity, in response to a second UPnP mirroring agent joining the second local network, thereby allowing for restricted use of the remote UPnP entity on the first local network; and
logic to transmit to the second UPnP mirroring agent all or a portion of a service description document to expose all or a subset of services provided by the one or more UPnP entities coupled to the first local network.

33. The system of claim 32, wherein the modem is adapted to communicate with the Internet service provider in a data transmission medium including at least one of coaxial, twisted wire pair and fiber optic cabling.

34. The system of claim 32, wherein the remote UPnP entity comprises a UPnP control point.

35. The system of claim 34, the system further comprising:
logic to receive an action request from the Internet connection originating at the UPnP control point; and
logic to forward the action request to at least one UPnP device coupled to the first network.

36. The system of claim 1 wherein said local address associated with the emulated UPnP entity on said first network is different from a local address allocated to said at least one remote UPnP entity on said second network.

37. The system of claim 36 wherein said UPnP mirroring agent includes logic to associate said local address associated with the emulated UPnP entity on said first network with said local address allocated to said at least one remote UPnP entity on said second network.

38. The system of claim 1, wherein only a subset of services provided by the remote UPnP entity are received by the UPnP mirroring agent, thereby restricting use of the remote UPnP entity by UPnP control points on the first local network.

39. The method of claim 6, wherein only a subset of services provided by the remote UPnP entity are received by the UPnP mirroring agent, thereby restricting use of the remote UPnP entity by UPnP control points on the first local network.

40. The article of claim 19, wherein only a subset of services provided by the remote UPnP entity are received by the UPnP mirroring agent, thereby restricting use of the remote UPnP entity by UPnP control points on the first local network.

41. The system of claim 32, wherein only a subset of services provided by the remote UPnP entity are received by the UPnP mirroring agent, thereby restricting use of the remote UPnP entity by UPnP control points on the first local network.

* * * * *